Jan. 26, 1965 J. H. STAAK 3,167,671
LINEAR MOTION DEVICE
Filed Aug. 5, 1960 2 Sheets-Sheet 1
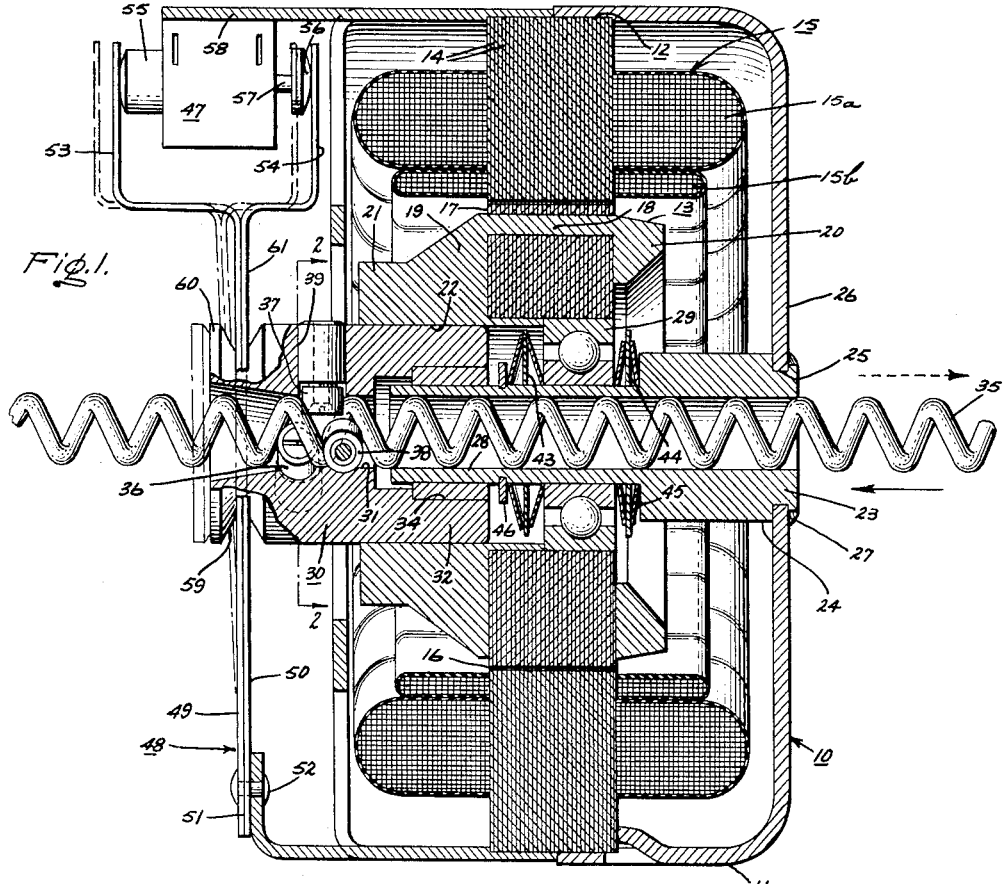
Fig. 1.
Fig. 2.
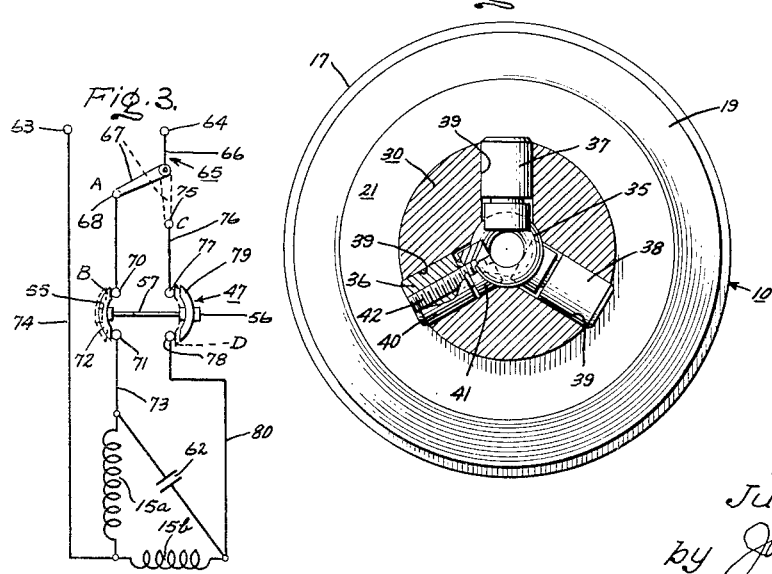
Fig. 3.
Inventor:
Julius H. Staak,
by John M. Stoudt
Attorney.

Inventor:
Julius H. Staak,
by John M. Stoudt
Attorney.

United States Patent Office 3,167,671
Patented Jan. 26, 1965

3,167,671
LINEAR MOTION DEVICE
Julius H. Staak, Fort Wayne, Ind., assignor to General
Electric Company, a corporation of New York
Filed Aug. 5, 1960, Ser. No. 47,863
15 Claims. (Cl. 310—83)

This invention relates to linear motion devices, and more particularly, to a device having an improved means for converting rotary motion into linear motion at relatively low speeds.

In many applications of linear motion devices used to convert rotary motion into linear motion, it is desirable to operate an object in a linear direction with the linear motion device being physically displaced from the operated object. This may be illustrated, for example, by the situation in which the operated object is a garage door, adapted to be moved along a track from a lower vertical position to an upper horizontal position located adjacent the ceiling of the garage. Such linear motion devices are usually constructed with an elongated solid shaft having a helical thread formed on its outer surface (commonly referred to as a "lead screw") which cooperates with an electrically operated rotary driving mmeber, such as a rotor, a plurality of gears and gear reduction means, and the garage door itself to translate rapid rotational movement of the rotary driving member into a linear axial displacement of the door.

These linear motion devices, however, have not been entirely satisfactory for one reason or another. Not only have the devices been relatively expensive to produce due to the number and type of parts required in their construction, but also the use of the elongated solid shaft has inherently limited the locations where the devices may be successfully employed. For instance, in those situations wherein it is desired to move the operated object through a plurality of planes; e.g., from a vertical to a horizontal position mentioned heretofore for the garage door, the linear motion device was mounted with its solid shaft disposed either horizontally or vertically, the shaft being secured to the operated object by a relatively complex coupling arrangement.

In addition, linear motion devices are generally employed where dirt and other foreign matter have a tendency to accumulate. Hence, prior to the present invention, the area of engagement between the solid helically threaded shaft and the cooperating rotary means; e.g. gear, was susceptible of becoming clogged due to the foreign matter which prevented proper operation of the device and in many cases, even resulted in premature failure thereof.

It will therefore be appreciated that the provision of an inexpensive yet satisfactory and versatile linear motion device is a continuing problem.

Accordingly, it is a primary object of the present invention to provide a linear motion device having improved means for converting rotary motion into linear motion.

It is another object of the present invention to provide an improved linear motion device having a coreless lead screw passing through and being driven by the rotary member of the device.

It is yet another object of this invention to provide an improved highly efficient means for translating rotary motion into axial linear displacement with the use of relatively inexpensive component parts.

It is still another object of the present invention to provide an improved means for automatically stopping operation of the linear motion device when the operated object has reached the desired position.

In carrying out the objects of this invention in one form thereof, I provide an improved linear motion device having a stator core with excitation windings and a rotor assembly in which the lead screw is a substantially rigid worm member formed of a relatively stiff wire material having evenly spaced helical turns and, as such, has no solid rigid center portion. The lead screw extends axially through a central bore provided in the rotor assembly which has pins or rollers projecting into the central bore for operatively connecting the rotor assembly with the lead screw whereby rotary motion of the rotor assembly drives the lead screw in a longitudinal direction and a wiping and self-cleaning action is produced between the lead screw and the rollers to keep the operative connection continuously free of dirt and other foreign matter.

Another feature of the present invention is the improved means for automatically stopping the operation of the linear motion device when the operated object has been displaced a predetermined distance or has reached the desired position; e.g., the extreme end of its longitudinal travel in either direction. In the preferred form, a switching means for deenergizing the excitation windings is connected to and actuated by a predetermined axial movement of the rotor assembly. When the coreless lead screw and operated object have reached the desired location, the longitudinal travel of the lead screw is halted. The rotor assembly, still revolving, moves axially along the screw to compress a flexible or resilient means and to actuate the switch means which, in turn, disconnects the windings from the source of power and the device ceases operation. The compressed resilient means will then return the rotor to its non-operative position.

The subject matter which I regard as my invention is particularly pointed out and distinctly claimed in the concluding portion of this specification. My invention, itself, however, both as to its organization and method of operation, together with further objects and advantages thereof, may best be understood by reference to the following description taken in connection with the accompanying drawings:

FIG. 1 is a side view, partially broken away and partially in cross section of an improved linear motion device embodying one form of the improved construction of the present invention;

FIG. 2 is an end view of the improved linear motion device of FIG. 1, looking in the direction of the arrows 2—2 in FIG. 1;

FIG. 3 is a schematic wiring diagram for the operation of the linear motion device of FIG. 1;

Figure 4:
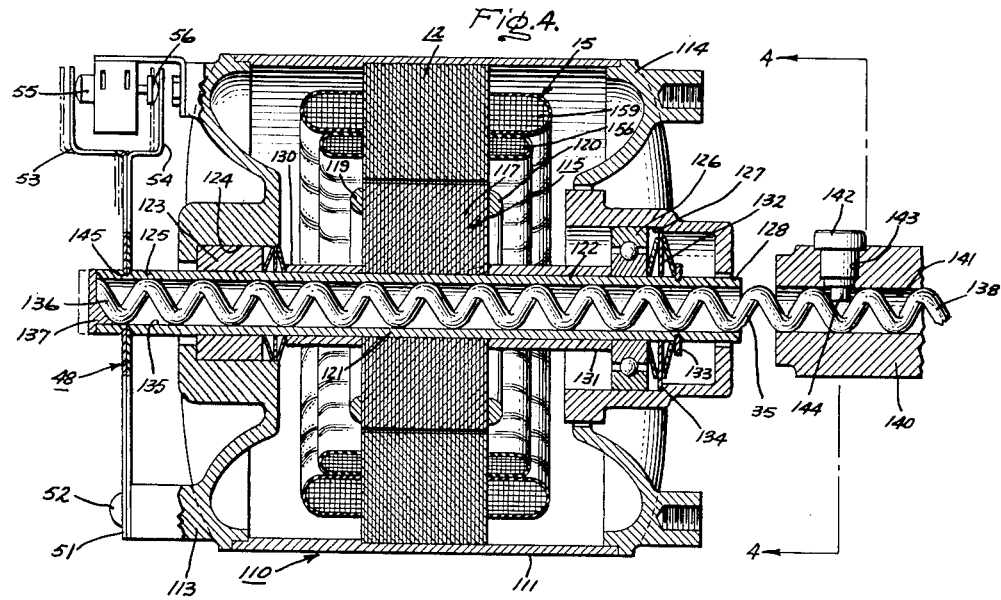
FIG. 4 is a side view, partially broken away and partially in cross section, of a linear motion device embodying the invention in another form thereof.

Referring now to FIGS. 1 and 2 of the drawings, there is shown one embodiment of a linear motion device, generally indicated by numeral 10, employing the present invention in one form thereof. Device 10 comprises a stationary frame 11 suitably supporting a stator core 12 and rotor assembly 13 for relative rotation. The illustrated stator core is of the split phase squirrel-cage type, being conventionally formed with a stack of laminations 14, fixedly secured together, and having the customary excitation windings 15, consisting of a main winding 15a and an auxiliary winding 15b, arranged thereon to provide reverse rotation of rotor assembly 13. Stator core 12 is also provided with an inner surface defining a rotor receiving bore 16.

The illustrated rotor assembly 13 of FIG. 1 consists of a body portion or laminated core 17 of magnetic material; e.g., a stack of laminations formed of suitable iron, having a standard squirrel-cage type winding 18. As shown, winding 18 includes a plurality of suitable conductors, such as cast aluminum, which extend the axial length of the rotor. All of the conductors may be electrically joined together at each end thereof, as by integrally cast end rings 19 and 20 which also assist in holding the laminations in a predetermined fixed and stacked relation. Rotor assembly 13 has a hub portion 21 integrally joined with end ring 19 and is provided with a central passageway or bore 22 which extends entirely through rotor body 17 and hub portion 21.

The illustrated means for supporting the rotor assembly 13 for relative rotation with stator core 12 preferably includes a tubular supporting member 23 formed with an enlarged end portion 24 suitably secured to frame 11, as by the arrangement shown in FIG. 1. More specifically, the extreme end of enlarged portion 24 projects through an accommodating opening 25 provided in wall 26 of frame 11, and the end is peened over against the wall 26, as indicated by numeral 27. The other end portion 28 of tubular member 23 projects axially into rotor bore 22 and is radially spaced from the inner surface of the bore. Tubular member 23 may be formed of any desirable non-magnetic material but, the material is preferably a wear resistance type, such as stainless steel. Rotor assembly 13 is rotatably mounted on tubular member 23 at one end by means of a ball bearing 29, which has its outer race mounted in rotor bore 22 as by an interference fit, and its inner race slidably mounted on the outer surface of member 23. A generally cup-shaped nut member 30, formed with a central axially extending passageway 31 (to be described in more detail hereinafter) has one end 32 mounted within the portion of rotor bore 22 defined by hub 21. A sleeve type bearing 33 rotatably supports the nut and hub side of rotor assembly 13, bearing 33 being tightly received in recess 34 located on the inner surface of passageway 31 in nut end 32. The inner surface of the sleeve bearing, in turn, is journalled on end portion 28 of tubular member 23.

With specific reference to my preferred arrangement for converting rotary motion of the rotor assembly 13 into lineal motion, as seen in FIG. 1, I provide a worm or lead screw 35, formed of helically wound heavy wire having evenly spaced apart turns, which has the object to be moved in a longitudinal direction (not shown) suitably secured to one of its ends, as by a simple clamp or a weld. Although lead screw 35 resembles a helically wound spring in appearance, its properties are dissimilar in that it is preferably wound to give only very small deflections in an endwise direction. Thus, its properties approach that for a straight rod when subjected to forces in compression or tension. However, unlike a rod, my lead screw 35 has no solid, rigid center portion and is therefore, in effect, a tightly wound worm member without a core; i.e., a "coreless" lead screw.

In the preferred embodiment, coreless lead screw 35 is operatively connected with rotor assembly 13 in the following manner. As illustrated in FIG. 1, lead screw 35 extends axially through tubular member 23 and nut 30, the inner diameter of both tubular member 23 and passageway 31 of nut 30 being slightly larger than the outer diameter of the coreless lead screw 35 to permit the lead screw to pass freely through rotor assembly 13. The driving connection between the rotor assembly 13 and coreless lead screw 35 is shown in the form of three pins or rollers 36, 37, and 38 respectively mounted in suitable equally spaced apart radially extending complementary openings 39, angularly disposed around nut 30. Each roller is maintained substantially perpendicular to the longitudinal axis of screw 35 and is axially advanced with respect to the adjacent roller by an amount approximately equal to one-third the pitch length of the coreless lead screw 35. In addition, each illustrated roller consists of a cylindrical body 40 (see FIG. 2 in particular), a freely rotatably member 41 slightly less in diameter than the diameter of opening 39 which accommodates a portion of it, and a screw member 42 which fastens rotatable member 41 to cylindrical body 40. With this arrangement, each rotatable member 41 projects into passageway 31 to engage and ride on the pitch diameter of the coreless lead screw 35.

While three rollers have been illustrated as the sole connection between the coreless lead screw 35 and nut 30, it will be appreciated that the proportion of the entire load to be carried by each roller is dependent upon the number of rollers employed, and the most desirable number of rollers required for any given application will ordinarily be determined by the load involved.

I have found that the foregoing relationship between the rollers and coreless lead screw 35 makes it unnecessary to adjust, with any degree of accuracy, the depth of each roller so long as it rides approximately on the pitch diameter of screw 35. In addition, the relationship between the rollers and coreless lead screw produces a wiping action therebetween which automatically removes dirt and other foreign matter from the vicinity of engagement and tends to make the device self-cleaning. Thus, the device does not have to incorporate a relatively complex and expensive sealing construction in an effort to prevent foreign matter from entering into the interior of the device and interfering with its proper operation. It should be additionally noted that the transformation of rotary motion into linear motion is accomplished with a high degree of efficiency in my device and if, for some reason; e.g., a power failure, it is desired to move manually coreless lead screw 35 in either axial direction, it may be done without disassembling coreless lead screw 35 from engagement with rotor assembly 13.

Turning now to another feature of my linear motion device, I provide an improved means for automatically stopping the operation of device 10 when lead screw 35 has reached the desired position; e.g., the object to be moved is in either of its extreme limits of movement. Referring once again to FIG. 1, it will be observed that the rotor assembly 13 is mounted for a predetermined amount of travel in the axial direction. Preferably, ball bearing 29 is of the type designed to take thrust loads in either axial direction and is flexibly mounted between a pair of Belleville type springs 43 and 44, the system being preloaded and under compression between shoulder 45, provided by one end of enlarged end portion 24 of tubular members 23, on the one side and a groove and snap ring constructions, generally indicated at 46, on the other side. Bearing 33, being journalled on tubular member 23, is also capable of axial movement. The significance of mounting the rotor assembly for predetermined movement in the axial direction will become more apparent as the description proceeds.

In the preferred embodiment, rotor assembly 13 is arranged to control the de-energization of the motor windings 15, and, consequently operation of the motor. As shown, the extreme end of nut member 30 of rotor assembly 13 projects beyond the stationary frame 11 and is formed with means for operating a conventional type multi-position control switch 47, which is connected in the motor winding circuit. More specifically, the illustrated means includes a switch actuating spring lever 48, composed of two superposed members 49 and 50, having one of its ends 51 pivotally secured to stationary frame 11, as by a rivet and frame extension construction 52. Members 49 and 50 are bent apart at the other end of lever 48 to form spaced apart movable legs 53 and 54 which cooperate with adjacent switch buttons 55 and 56 respectively, the buttons being arranged to move as a unit by a rod 57 secured between them. Switch 47 is, in turn, rigidly secured to frame 11 by any suitable means, such as on frame extension 58 which projects outwardly from frame 11 of device 10. A circumferential groove 59 is provided around end 60 of nut member 30 and central portion 61 of switch lever 47 is accommodated in the groove. Thus, it will be appreciated that axial movement of rotor assembly 13 will control the actuation of switch 47 by the cooperation of nut end 60 with the switch actuating lever 48. The precise way in which rotor assembly 13 controls the actuation of switch 47 will be explained in more detail during the description of the operation of device 10 set out hereinafter.

FIG. 3 is a schematic representation of one possible electrical circuit for energizing and de-energizing windings 15a and 15b and for achieving a reversal of rotation of rotor assembly 13. In the illustrated arrangement, a capacitor 62 is connected across the windings 15a and 15b so that device 10 operates in the well-known manner of a reversible permanent-split phase capacitor motor. These windings are adapted to be excited from an external alternating current power source 63 and 64 through a double throw switch 65 connected in series with switch 47. More specifically, when switches 47 and 65 are in the positions indicated by the solid lines and denoted respectively by letters A and B in FIG. 3, the windings will be energized from the power source through conductor 66, contactor 67 and contact 68 of double throw switch 65, through conductor 69 to contacts 70–71 and contactor 72 of switch 47, and from conductor 73 through the windings and capacitor 62 to conductor 74. With this connection, winding 15a is energized as the main winding and winding 15b is the auxiliary winding.

Conversely, when contactors 67 and 72 of switches 47 and 65 resepctively are in the positions represented by the broken lines in FIG. 3 and indicated by letters C and D respectively, the circuit will be completed through conductor 66, contactor 67 and contact 75 of switch 65, to contacts 77–78 bridged by contactor 79 of switch 47 through conductor 76, and from the latter switch, and through conductor 80 and the windings and capacitor 62 to conductor 74. With switch 65 in position C and switch 47 in position D, winding 15b becomes the main winding and winding 15a becomes, in effect, the auxiliary winding, the theory of interchanging main and auxiliary winding functions and the resulting reversal of rotation of rotor assembly 13 being well understood in the art.

The novel features and advantages of the present invention will become even more apparent from the following description of the operation of device 10 of FIGS. 1 and 2. Let it be assumed, for instance, that both the contactors of switches 65 and 47 are in the first described positions, that is, in positions A and B, with windings 15a and 15b being energized as previously explained. If it is further assumed that under such conditions rotor assembly 13 is rotated in a direction to move coreless lead screw 35 to the left as viewed in FIG. 1 (the direction indicated by the solid arrow), then the normal axial load resulting from the cooperation between rotor assembly 13 and coreless lead screw 35 will force rotor assembly 13 toward shoulder 45 (to the right in FIG. 1), compressing spring 44 a predetermined amount, but not a sufficient amount to totally depress the spring. In addition, nut member 30, being secured to rotate with the rotor, will also be disposed toward the right.

When the object to be moved (not shown), which is secured to one of the ends of coreless lead screw 35, has reached its desired position, such as when the object and screw 35 have reached the limit of their movement of translation in either direction, the operated object and screw 35 may be halted from traveling further by any suitable means, such as by the engagement of the operated object with any means disposed in its path of travel (not shown). With the longitudinal travel of screw lead 35 stopped, rotor assembly 13 which is still revolving, will move axially to the right along screw 35 toward spring 44, further compressing the spring. At the same time, nut member 30, being part of rotor assembly 13, will move from the dotted position in FIG. 1 to the solid position (the extreme right). Nut 30, being operatively connected to contactors 72 and 79 of switch 47 through the intermediaries of switch actuating lever 48 and switch buttons 55 and 56, will move the contactors to the right, position D in FIG. 3. Thus, with contactor 67 of double throw switch 65 still in position A, connecting conductor 66 only with contact 70 of switch 47, contactor 72 will be moved out of engagement with its contacts 70–71 of switch 47, opening the winding circuit. Contactor 79 now bridges contacts 77–78, but inasmuch as contactor 79 is out of the circuit, it will simply act to connect the windings with contact 75 of switch 65 when the direction of rotation of the device is next reversed and switch 65 is moved to position C. With windings 15a and 15b de-energized and disconnected from the power source, device 10 will cease operation and rotor assembly 13 will stop rotation. With cessation of rotation of rotor assembly 13, the axial load applied to spring 44 by the rotor assembly is removed and the compressed spring will return the rotor assembly 13 to its non-operated or normal position, as determined by the spring system.

If it is desired to initiate operation of device 10 once again, contactor 67 of switch 65 may be moved to position C. Since switch 57 is already in position D (as explained above), then windings 15a and 15b will be energized through the circuit previously described, and reverse rotation of rotor assembly 13 will be achieved. In this case, rotor assembly 13 will rotate in a direction to move coreless lead screw 35 to the right (in the direction of the broken arrow in FIG. 1) and, consequently, a normal operating axial load will be placed upon spring 46 by rotor assembly 13, compressing the spring a predetermined amount. Under these circumstances, the object to be moved and coreless lead screw 35 will continue to move longitudinally to the right until coreless lead screw 35 and the object have reached the desired position of translation in the axial direction.

In the same manner as first described above for the opposite direction of rotation of rotor assembly 13, when screw 35 no longer travels in a longitudinal direction, rotor assembly 13 will move along screw 13 toward spring 46, further depressing it. In addition, nut member 30 forces switch lever 48 to the left (shown by the dotted lines in FIG. 1). Switch lever 48 moves buttons 55 and 56, and consequently switch contactors 72 and 79 to position B shown in FIG. 3. Thus, contacts 77–78 of switch 47 are opened, breaking the circuit to windings 15a and 15b, and contacts 70–71, which are out of the winding circuit at this time, are closed by contactor 72. It will be seen that operation of switch 47, by the action of rotor assembly 13, de-energizes the windings to cease operation of device 10 while, at the same time, switch 47 is positioned to energize the windings once again when switch 65 is moved from position B to position A to initiate operation of device 10 in a reverse direction.

It will be observed that through the operation of switch 47, which is automatically actuated by rotor assembly 13, the direction of movement of rotor assembly 13, and accordingly, direction of travel of coreless lead screw 35 may be readily controlled, and the same switch controls the de-energization of the windings when coreless lead screw 35 reaches the desired position of translation in either axial direction.

In addition to the advantages already mentioned for my invention, it will be appreciated that coreless lead screw 35 is, in effect, resilient along its axial length like an elongated coil spring, and may be curved along its axis during operation of device 10 to move the operated object from one plane to another without affecting proper operation of device 10. Moreover, screw 35 may be secured to the operated object without requiring a relatively complex coupling construction. Further, device 10 is exceedingly quiet during operation, due in part to the flexible mounting structure for controlling the axial movement of rotor assembly 13, which has inherent damping and force deflection characteristics. The flexible mounting eliminates objectionable knocking or bumping sounds which would otherwise originate from the axial vibration of the rotor assembly during rotation.

Other advantages of my invention may readily occur to those skilled in the art, and it should be apparent that the present invention is not limited to the embodiment illustrated in FIGS. 1–3 inclusive, but may be varied without a departure from the true scope and spirit of the invention.

Figure 5:
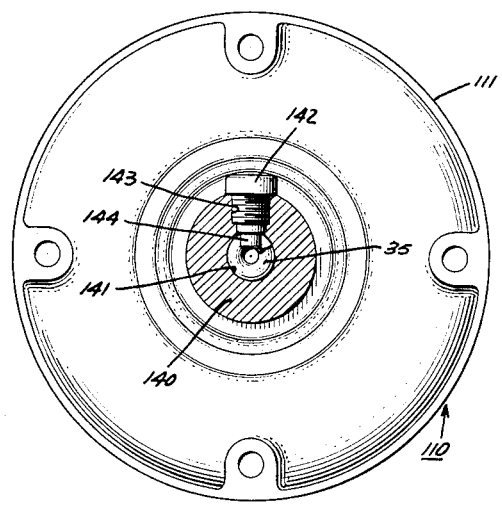
FIG. 5 is an end view of the linear motion device of FIG. 4 looking in the direction of the arrows.

FIGS. 4 and 5 illustrate a second embodiment of my invention, and for ease of representation, like reference numerals designate like parts heretofore set forth in connection with the first embodiment. The improved linear motion device of the second embodiment, generally denoted by number 110, comprises a stationary frame 111 including a central shell 112 and a pair of end shields 113 and 114, which supports a stator core 12, similar in construction to that previously described in detail and illustrated in FIG. 1, having excitation windings 15 arranged thereon.

Rotor assembly 115 of the second embodiment consists of a body portion 117 of magnetic material having a standard squirrel-cage type winding 118 with integrally cast end rings 119 and 120. Body portion 117 is secured, in any suitable manner, to an elongated tubular member 121, which extends axially through a central rotor bore 122.

The illustrated means for rotatably supporting rotor assembly 115 consists of a sleeve type bearing 123, tightly received in recess 124 provided in end shield 113, and having its inner surface journalled on end portion 125 of tubular member 121 which projects beyond to outer surface of end shield 113. The other side of the rotor is supported by ball bearing 126, mounted in recess 127 provided in end shield 114. Preferably bearing 126 is designed to take thrust loads in either axial direction. The inner race of bearing 126 is slidably mounted on end 128 of tubular member 121.

Like the first embodiment, flexible means are provided to resist axial movement of rotor assembly 115 in either axial direction. This is accomplished in the illustrated arrangement of FIGS. 4 and 5 by a spring system in which the left side of rotor body portion 117 (as viewed in FIG. 4) has a Belleville type spring 129 disposed adjacent bearing 123 in recess 124 and a spacer 130 between the spring and rotor body portion 117. On the other side of rotor body portion 117, a spacer 131 is positioned between body portion 117 and bearing 126. A second Belleville spring, 132, is disposed in abutting relation on the right side of bearing 126, the spring being compressible between bearing 126 and a groove and snap ring construction on tubular member 121, indicated by numeral 133, and shoulder 134 provided in recess 127. Under normal axial thrust loads, the springs compress and resist axial movement of rotor assembly 115 to control its travel within predescribed limits. Under heavier thrust loads, e.g., nut 130 having ceased movement and rotor assembly 115 continuing to turn and to move axially, the springs are capable of being compressed still further. This permits the rotor assembly 115, with tubular member 121, to move axially in the manner described for the first embodiment of FIGS. 1 and 2.

In the particular construction shown by FIGS. 4 and 5 for converting rotary motion of rotor assembly 115 into axial motion, coreless lead screw 35, previously described in detail for the first embodiment, may be conveniently secured to rotor assembly 115 so that the joined parts rotate as a single unit. For example, lead screw 35 may pass through a central passageway 135 of tubular member 121 and one of its ends, 136, may be fixedly attached to end portion 125 of member 121 in any suitable fashion; e.g., weld 137. The other end 138 of screw 35 projects beyond end portion 128 of member 121, and a nut 140, suitably fastened to the object to be moved (not shown) or formed as an integral part of that object, has a bore 141 for receiving screw 35. The driving connection between coreless lead screw 35 and nut 140 is illustrated in the form of a single pin 142, accommodated in opening 143 provided substantially perpendicular to the longitudinal axis of screw 35. Pin 142 has a rounded portion 144 engaging and riding on the pitch diameter of coreless lead screw 35. This engagement provides the same advantageous wiping action as that for the first embodiment. It will be recognized that with this construction, coreless lead screw 35 will rotate with rotor assembly 115 and will drive nut 140 axially, the direction of axial travel being dependent upon the direction of rotation of rotor assembly 115.

It will be recognized from the foregoing description of FIGS. 4 and 5 that device 110 may be started and automatically stopped in the same fashion as previously outlined for device 10. For instance, a circumferential groove 145 may be formed on the outer surface of end portion 125 of tubular member 121 and switch actuating lever 48, having end 51 suitably secured to frame 111, has its central portion 61 accommodated in the groove and has its other end cooperating with switch 47. Thus, when the object to be moved and nut 140 have reached the desired position, further axial movement of rotor assembly 115 will control the actuation of switch 47 in the manner described for the first embodiment.

Thus, the control circuit schematically illustrated in FIG. 3 for energizing and de-energizing windings 15a and 15b and for achieving a reversal of rotation of rotor assembly 13, may be employed to perform the same functions in the second embodiment of my invention, and the second embodiment will have the same inherent improved automatic control and other advantageous features mentioned for the embodiment illustrated by FIGS. 1 and 2.

It should be apparent to those skilled in the art that while I have shown and described what at present are considered to be the preferred embodiments of my invention in accordance with the patent statutes, changes may be made in the structure disclosed without actually departing from the true spirit and scope of this invention, and I therefore intend to cover in the following claims all such equivalent variations as fall within the invention.

What I claim as new and desire to secure by Letters Patent of the United States is:

1. For use in a linear motion device, a mechanical movemen arrangement comprising a coreless worm member having helical turns formed of relatively stiff wire material, the wire being substantially nonexpansible in its helically wound form and having stiff rod-like characteristics when subjected to axial compressive and tensive forces, and a nut member having a bore extending axially therethrough for receiving said worm member, said worm member being substantially greater in axial length than said nut member, said nut member having means operatively connecting said worm member and said nut member together whereby rotary motion of one of said members imparts linear motion to said other member.

2. A mechanical movement device comprising a substantially rigid coreless worm member having substantially non-expansible evenly spaced helical turns formed of relatively stiff wire material and having stiff rod-like characteristics when subjected to axial compressive and tensive forces, a nut member formed with an axially extending bore therein for receiving said worm member, said nut member having at least one substantially radially extending aperture communicating with said bore, said wire member being substantially greater in axial length than said nut member and means accommodated in said aperture projecting into said bore for operatively connecting said coreless worm member with said nut member, said means comprising at least one roller engaging the sides of said worm at a predetermined position whereby rotary movement of one of said members imparts linear motion to other of said members and produces a wiping and self-cleaning action between said roller and said worm member.

3. In a linear motion device including an electric motor having a stator, a rotor, and means for rotatably supporting said rotor relative to said stator; a substantially rigid coreless worm member having substantially non-expansible helical turns formed of a relatively stiff wire material with stiff rod-like characteristics when subjected to axial compressive and tensive forces; a nut member formed with a bore extending therethrough for receiving said worm member; said wire member being substantially greater in axial length than said nut member; one of said members secured to rotate with said rotor and said nut member having means projecting into said bore for operatively connecting said members together whereby rotary motion imparted to one of said members by said rotor drives said other member in a longitudinal direction.

4. In a linear motion device including an electric motor having a stationary assembly; a rotor assembly, and means for rotatably supporting said rotor assembly relative to said stationary assembly; a substantially rigid coreless worm member having substantially non-expansible helical turns formed of a relatively stiff wire material with stiff rod-like characteristics when subjected to axial compressive and tensive forces; said coreless wire member being substantially greater in axial length than that of said stationary assembly; a nut member formed with a bore extending axially therethrough for receiving said worm member within said bore; one of said members secured to said rotor assembly; means for reversing rotation of said rotor assembly; and means projecting into the bore of said nut member operatively connecting said members together whereby rotary motion imparted to one of said members by said rotor assembly drives said other member in a longitudinal direction.

5. In a linear motion device; an electric motor having a stationary assembly, a rotor assembly, and means for rotatably supporting said rotor assembly relative to said stationary assembly; a substantially rigid coreless worm member having substantially non-expansible evenly spaced helical turns formed of a relatively stiff wire material with stiff rod-like characteristics when subjected to axial compressive and tensive forces secured to rotate with said rotor assembly; said coreless wire member being substantially greater in axial length than said stationary assembly; a nut member formed with a bore extending axially therethrough for receiving said worm member; said nut member having at least one projection extending into said bore in engagement with the sides of said coreless worm turns operatively connecting said members together whereby rotary motion imparted to said coreless worm member by said rotor assembly drives said nut member in a longitudinal direction and produces a wiping and self-cleaning action between said roller means and said coreless worm member.

6. In a linear motion device; an electric motor having a stationary assembly, a rotor assembly, and means for rotatably supporting said rotor assembly relative to said stationary assembly; a substantially rigid coreless worm member having evenly spaced helical turns formed of a relatively stiff wire material with stiff rod-like characteristics when subjected to axial compressive and tensive forces; said rotor assembly formed with a bore extending axially therethrough for receiving said worm member; said wire member being substantially greater in axial length than said stationary assembly; said rotor assembly including roller means attached to rotate with said rotor assembly projecting into said bore and into engagement with the turns of said coreless worm member at predetermined positions for operatively connecting said coreless worm member and said rotor assembly together whereby rotary motion imparted to said coreless worm member by said rotor assembly drives said coreless worm in a longitudinal direction and produces a wiping and self-cleaning action between said roller means and said coreless worm member.

7. For use in a linear motion device, a stationary assembly including a stator core having excitation windings arranged thereon, a rotatable and axially movable rotor assembly, said stationary assembly having rotor supporting means rotatably carrying said rotor assembly, switch means carried by said stationary assembly arranged to de-energize said windings, a switch actuating lever attached adjacent one end to stationary assembly and having the other end in actuating relation with said switch means, said lever operatively connected intermediate its ends to said rotor assembly whereby a predetermined axial movement of said rotor assembly actuates said switch means to de-energize said windings.

8. For use in a linear motion device, a stationary assembly actuating a stator core having excitation windings arranged thereon and adapted to be connected to a power source, a rotatable and axially movable rotor assembly, rotor supporting means rotatably carrying said rotor assembly, switch means arranged to disconnect said windings from the power source, a switch actuating lever comprised of a pair of spring members pivotally attached at one end to said stationary assembly, the other end of said spring members being separated and in operative engagement with said switch means, said lever and rotor assembly being operatively connected such that a predetermined axial movement of said rotor assembly in either direction flexes said lever in that direction thereby actuating said switch means, and flexible means including at least two resilient members for controlling axial movement of said rotor assembly in either axial direction and for returning said rotor assembly to its nonoperative position.

9. In a linear motion device, a stator core having excitation windings arranged thereon and adapted to be connected with a power source, a rotatable and axially movable rotor assembly, means for rotatably supporting said rotor assembly relative to said stator core, means resisting axial movement of said rotor assembly in either axial direction, a lead screw member, a nut member formed with a bore extending axially therethrough for receiving said lead screw member within said bore and being operatively connected with said lead screw member, one of said members secured to rotate with said rotor assembly, switching means operatively connected to said rotor assembly and arranged to disconnect said excitation windings from the power source whenever said lead screw member causes said rotor assembly to overcome the axially resisting means and move said rotor assembly a predetermined axial distance, said rotor assembly actuating said switch means to disconnect said windings from the power source and said axially resisting means tending to move said rotor assembly toward its nonoperative position.

10. In a linear motion device, a stator core having excitation windings arranged thereon and adapted to be connected with a power source, a rotatable and axially movable rotor assembly, flexible means for biasing said assembly toward its nonoperative position, means for rotatably supporting said rotor assembly relative to said stator core, a nut member formed with a bore extending axially therethrough secured to rotate with said rotor assembly, a substantially rigid coreless lead screw member formed of evenly spaced turns of a relatively stiff wire material with rod-like characteristics when subjected to axial compressive and tensive forces received within said bore, said nut having at least one projection extending into said bore and in engagement with the turns of said coreless lead screw member whereby rotary motion of said nut imparts linear motion to said coreless lead screw member, switching means operatively connected to said rotor assembly and arranged to disconnect said excitation windings from the power source, whereby interference with movement of said lead screw member causes said rotor assembly to overcome the bias of said flexible means and moves said rotor assembly a predetermined axial distance thereby actuating said switch means to disconnect said windings from the power source with said flexible means tending to return said rotor assembly to its nonoperative position.

11. In a linear motion device, a stationary assembly including a stator core having excitation windings arranged thereon and adapted to be connected with a power source, a rotatable and axially movable rotor assembly, means for rotatably supporting said rotor assembly relative to said stator core, a substantially rigid coreless lead screw member formed of evenly spaced turns of a relatively stiff wire material with rod-like characteristics when subjected to axial compressive and tensive forces and secured to rotate with said rotor assembly, said coreless lead screw member projected axially beyond the confines of said stationary assembly and forming a track, a nut member formed with a bore extending axially therethrough for receiving said lead screw member within said bore and having at least one projection extending into said bore in engagement with the turns of said coreless lead screw member whereby rotary motion imparted to said coreless lead screw by said rotor assembly drives said nut member in a longitudinal direction on the track-forming coreless screw member, switching means operatively connected to said rotor assembly and arranged to disconnect said excitation windings from the power source, whereupon a predetermined axial movement of said rotor assembly actuates to disconnect said windings from the power source for stopping rotation of said rotor assembly, and flexible means for controlling axial movement of said rotor assembly and for returning said rotor assembly to its nonoperative position.

12. In a linear motion device having a lead screw member, a rotor assembly comprising a core including winding, a hub portion joined adjacent to said core solely adjacent one lateral side thereof, said core and hub portion including communicating bores extending axially therethrough to receive the lead screw member in spaced relation, said portion having means projecting into its bore for driving the lead screw member in a linear direction upon rotation of the rotor assembly, said means being the sole driving connection between said rotor assembly and the lead screw member.

13. In a linear motion device having a lead screw member, a frame assembly, a stator, and rotor assembly, said rotor assembly comprising a core including a cast winding with end rings, a nut section joined to said core adjacent one of said end rings for rotation therewith as a unit, said core and nut section having aligned bores extending entirely therethrough for receiving the lead screw member in spaced relation, said nut section including means projecting into the bore for imparting a linear motion to the lead screw member upon rotation of said rotor assembly, means rigidly connected to said frame assembly adjacent the side of said rotor assembly remote from said nut section for supporting said rotor assembly for relative rotation with respect to the stator and frame assembly, and flexible means for controlling the axial movement of said rotor assembly and for normally maintaining said assembly in a central position with respect to the stator.

14. In a linear motion device having a lead screw member, a frame assembly including a stator, a rotor assembly comprising a core carrying a cast winding formed with end rings, a nut section joined to said core adjacent one side thereof, said core and nut section including a passageway extending entirely therethrough, a tubular member secured at one end to said frame assembly and projecting into but not entirely through said passageway in spaced relation therewith, a pair of bearings mounted on said tubular member disposed in said passageway supporting said rotor assembly for relative rotation with respect to said frame assembly and permitting limited relative axial movement of said assemblies, said nut section including means projecting into said passageway axially beyond said tubular member for engaging the lead screw member and for driving the member linearly through the tubular member and remaining portion of said passageway.

15. In the linear motion device having a lead screw member; a split phase reversible motor comprising a frame assembly; a rotatably and axially movable rotor assembly supported by said frame assembly, a stator core; a pair of angularly displaced excitation windings carried by said core and arranged to be connected across a power source through a main control switch for causing said rotor assembly to rotate in either direction; phase displacing means; said frame assembly rotatably supporting said rotor assembly relative to said stator core, a nut member formed with a bore extending axially therethrough for receiving said lead screw member within said bore and operatively engaging said lead screw member, one of said members secured to rotate with said rotor assembly; switch means mounted on said stationary member including two sets of contacts with each side connected in series to one side of the control switch and to one side of the windings for selectively connecting either of said windings in series with said phase displacing means and in parallel with the other of said windings, only one set of said contacts being closed at any given time; a lever operatively connecting said rotor assembly and switch means together; means resisting axial movement of said rotor assembly in either axial direction; said lever being actuated by said rotor assembly whenever said lead screw member causes said rotor assembly to overcome the axially resisting means and to move a predetermined axial distance, said switching means when actuated by said lever disconnecting said excitation windings from the power source, with said axially resisting means tending to return said rotor assembly to its non-operated position.

References Cited by the Examiner

UNITED STATES PATENTS

| 1,131,551 | 3/15 | Price | 310—209 |
| 1,983,962 | 12/34 | Barber et al. | 74—504 |
| 2,446,393 | 8/48 | Russel | 318—286 |
| 2,464,847 | 3/49 | Coffey | 310—209 |
| 2,763,797 | 9/56 | Dean | 318—475 |
| 2,875,464 | 3/59 | Collins | 318—477 |
| 2,936,646 | 5/60 | Gould | 74—465 |

MILTON O. HIRSHFIELD, *Primary Examiner.*